US012747385B2

(12) United States Patent
Aung et al.

(10) Patent No.: US 12,747,385 B2

(45) Date of Patent: Sep. 29, 2026

(54) APPLICATION OF ORGANIC OXIDIZER AND ENZYME COMBINATION AS BREAKER FLUID FOR FILTER CAKE CLEANUP

(71) Applicant: SCHLUMBERGER TECHNOLOGY CORPORATION, Sugar Land, TX (US)

(72) Inventors: Tint Htoo Aung, Houston, TX (US); Cedric Manzoleloua, Houston, TX (US); Balakrishnan Panamarathupalayam, Houston, TX (US); Edward Derkach, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/995,682

(22) PCT Filed: Jul. 17, 2023

(86) PCT No.: PCT/US2023/070320

§ 371 (c)(1),
(2) Date: Jan. 16, 2025

(87) PCT Pub. No.: WO2024/020339

PCT Pub. Date: Jan. 25, 2024

(65) Prior Publication Data

US 2026/0042953 A1 Feb. 12, 2026

Related U.S. Application Data

(60) Provisional application No. 63/368,706, filed on Jul. 18, 2022.

(51) Int. Cl.
*E21B 37/06* (2006.01)
*C09K 8/52* (2006.01)

(52) U.S. Cl.
CPC ................ *C09K 8/52* (2013.01); *E21B 37/06* (2013.01)

(58) Field of Classification Search
CPC ................................. C09K 8/52; E21B 37/06
See application file for complete search history.

(56) References Cited

U.S. PATENT DOCUMENTS

| | | | | |
|---|---|---|---|---|
| 10,208,239 | B2 | 2/2019 | Ballard | |
| 10,214,677 | B2 | 2/2019 | Panamarathupalayam et al. | |
| 2003/0114314 | A1 | 6/2003 | Ballard et al. | |
| 2007/0204997 | A1* | 9/2007 | Harris | C09K 8/03 166/311 |
| 2011/0005773 | A1 | 1/2011 | Dusterhoft | |
| 2011/0061870 | A1* | 3/2011 | Navarro-Mascarell | C09K 8/524 507/201 |
| 2013/0333886 | A1* | 12/2013 | George | C09K 8/514 166/278 |
| 2015/0114646 | A1* | 4/2015 | Price Hoelscher | C09K 8/032 166/302 |
| 2015/0141302 | A1 | 5/2015 | Nasr-El-Din et al. | |
| 2016/0096908 | A1* | 4/2016 | Wang | C09K 8/528 507/224 |
| 2017/0210969 | A1* | 7/2017 | Pisanova | E21B 37/06 |
| 2019/0016947 | A1 | 1/2019 | Mahmoud | |
| 2020/0199439 | A1* | 6/2020 | Dugonjic-Bilic | E21B 43/26 |

FOREIGN PATENT DOCUMENTS

| | | | |
|---|---|---|---|
| EP | 2360223 | A1 | 8/2011 |
| WO | 2012171857 | A1 | 12/2012 |
| WO | 2020232327 | A1 | 11/2020 |

OTHER PUBLICATIONS

International Search Report and Written Opinion of International Patent Application No. PCT/US2023/070320 dated on Nov. 1, 2023, 10 pages.

* cited by examiner

*Primary Examiner* — Silvana C Runyan
(74) *Attorney, Agent, or Firm* — Jeffrey D. Frantz

(57) ABSTRACT

A method may include introducing a breaker fluid into a wellbore having a filter-cake on the walls therein, wherein the breaker fluid comprises an organic peroxide; an aqueous solution; an enzyme; and a chelating agent; wherein the breaker fluid degrades a filter-cake along the wellbore wall in the subterranean formation.

16 Claims, 5 Drawing Sheets

| **Test No** | | **1** | | **2** | |
|---|---|---|---|---|---|
| **Drilled Solid Contamination in WBDF** | | **1%** | | **2%** | |
| Products | | Concentration | | Concentration | |
| | | lb/bbl | vol/vol | lb/bbl | vol/vol |
| Water | | 78.4 | 0.224 | 78.4 | 0.224 |
| Chelating Agent | | 300 | 0.714 | 300 | 0.714 |
| Enzyme | | 25 | 0.062 | 25 | 0.062 |
| FCBF Density | SG | 1.15 | | 1.15 | |
| **Injectivity @ 5 psi** | % | 0 | | 0 | |

| Test | 1 | 2 | 3 | 4 | 5 |
|---|---|---|---|---|---|
| WBDF System | FLOPRO NT | FLOPRO NT | FLOPRO NT | FLOPRO NT | FLOPRO NT |
| Products | Concentrations lb/bbl | Concentrations lb/bbl | Concentrations lb/bbl | Concentrations lb/bbl | Concentrations lb/bbl |
| Lubricant | - | - | 10 | - | 10 |
| Shale Inhibitor | - | - | - | 7 | 7 |
| Internal Oxidizer | - | 1 | 1 | 1 | 1 |

| **Test No** | | **1** | | **2** | |
|---|---|---|---|---|---|
| **Drilled Solid Contamination in WBDF** | | **1%** | | **2%** | |
| Products | | Concentration | | Concentration | |
| | | lb/bbl | vol/vol | lb/bbl | vol/vol |
| 12.5 lb/gal Sodium Bromide | | 13.2 | 0.025 | 22.8 | 0.043 |
| Water | | 75.2 | 0.215 | 70.6 | 0.202 |
| Chelating Agent | | 300 | 0.714 | 285 | 0.679 |
| TBHP | | 15 | 0.046 | 25 | 0.076 |
| FCBF Density | SG | 1.15 | | 1.15 | |
| **Injectivity @ 5 psi** | **%** | **0** | | **0** | |

| Test No | | 1 | | 2 | | 3 | |
|---|---|---|---|---|---|---|---|
| **Drilled Solid Contamination in WBDF** | | **1%** | | **1%** | | **2%** | |
| Products | | Concentration | | Concentration | | Concentration | |
| | | lb/bbl | vol/vol | lb/bbl | vol/vol | lb/bbl | vol/vol |
| 12.5 lb/gal Sodium Bromide | | 14.8 | 0.028 | 11.8 | 0.023 | 11.8 | 0.023 |
| Water | | 73.5 | 0.210 | 76.5 | 0.219 | 76.5 | 0.219 |
| Chelating Agent | | 285 | 0.679 | 285 | 0.679 | 285 | 0.679 |
| Enzyme | | 15 | 0.037 | 20 | 0.050 | 20 | 0.050 |
| TBHP | | 15 | 0.046 | 10 | 0.031 | 10 | 0.031 |
| FCBF Density | SG | 1.15 | | 1.15 | | 1.15 | |
| **Injectivity @ 5 psi** | **%** | **54** | | **42** | | **21** | |

APPLICATION OF ORGANIC OXIDIZER AND ENZYME COMBINATION AS BREAKER FLUID FOR FILTER CAKE CLEANUP

CROSS REFERENCE PARAGRAPH

This application is a National Stage Entry of International (PCT) Application No. PCT/US2023/070320, filed Jul. 17, 2023, which claims priority to and the benefit of U.S. Provisional Application No. 63/368,706, entitled "APPLICATION OF ORGANIC OXIDIZER AND ENZYME COMBINATION AS BREAKER FLUID FOR FILTER-CAKE CLEANUP," filed Jul. 18, 2022, the disclosure of which is hereby incorporated herein by reference.

FIELD OF THE DISCLOSURE

The present disclosure is generally directed to methods and compositions for a filter-cake breaker fluid, including an organic oxidizer, an aqueous solution, an enzyme, and a chelating agent used to break additives in water-based drilling fluids along a wall of a wellbore on a subterranean formation.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate.

One way of protecting the formation is by forming a filter-cake on the surface of the subterranean formation. Filter-cakes are formed when particles, suspended in a wellbore water-based drilling fluid, coat and plug the pores in the subterranean formation such that the filter-cake prevents or reduces both the loss of fluids into the formation and the influx of fluids present in the formation.

Biopolymers and lubricants are common additives in water-based drilling fluids (WBDF) for solid suspension and lubricity purposes. When used in the reservoir section for open-hole completion, the filter-cakes containing biopolymer and lubricant are challenging to be removed by filter-cake breaker fluids (FCBF). The effect is more profound in direct injector wells where the well cannot be put on production to flow back the filter-cake residues resulting in unsatisfactory injection.

The removal of a filter-cake has been conventionally achieved with water-based treatments such as oxidizers and other aqueous solutions. However, many of the approaches with the use of conventional water-based treatments have some limitations, such as premature temperature-induced activation and compatibility with other additives in the WBDF, as well as the ineffectiveness of removing starch contained in the filter-cake.

The productivity of a well is somewhat dependent on effectively and efficiently removing the filter-cake while minimizing the potential of water blocking, plugging, or otherwise damaging the natural flow channels of the formation, as well as those of the completion assembly.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, a breaker fluid is provided. The breaker fluid may include an organic peroxide, an aqueous solution, an enzyme, and a chelating agent, wherein the breaker fluid is dispersed in a subterranean formation. The breaker fluid may also include degrading a filter-cake along the wellbore wall in the subterranean formation.

In an embodiment, the breaker fluid may include an organic peroxide including hydroperoxide, peroxyacid, ketone peroxide, peroxyester, dialkylperoxide, peroxydicarbonate, peroxycarbonate, diacylperoxide, or cyclic ketone peroxide.

In an embodiment, the breaker fluid may include a hydroperoxide including alkyls, alkenes, cycloalkanes, steroids, fatty acids, and/or terpenes.

In an embodiment, the breaker fluid may include an hydroperoxide including a tert-butyl-hydroperoxide.

In an embodiment, the breaker fluid may include an organic peroxide including 0.1 to 10% by volume of the breaker fluid.

In an embodiment, the breaker fluid may include an enzyme including 1 to 10% by volume of the breaker fluid.

In an embodiment, the breaker fluid may include a chelating agent including 5 to 80% by volume of the breaker fluid.

In an embodiment, the breaker fluid may include an enzyme including an alpha-amylase.

In an embodiment, the breaker fluid may include a chelating agent including EDTA (ethylenediamine tetraacetic acid), HEDTA (hydroxyethylenediamine triacetic acid), NTA (nitriolotriacetic acid), or citric acid.

In an embodiment, the breaker fluid may include an aqueous solution, wherein the aqueous solution includes water.

In an embodiment, the breaker fluid may include an aqueous solution, wherein the aqueous solution includes a brine.

In an embodiment, the breaker fluid may include brine, wherein the brine is water including sodium bromide, potassium bromide, potassium chloride, sodium chloride, cesium bromide, or a combination thereof.

In an embodiment, the breaker fluid may include an aqueous solution wherein the aqueous solution includes sodium bromide.

In an embodiment, the breaker fluid may include a density breaker fluid of less than 13 lb/gal.

In an embodiment the breaker fluid may include wherein the wellbore temperature is less than 250° F.

In one or more embodiments, a method of a breaker fluid degrading a filter-cake along the wellbore wall in a subterranean formation is provided. The method may include introducing a breaker fluid into a wellbore on a subterranean formation, wherein the breaker fluid includes an organic peroxide, an aqueous solution, an enzyme, and a chelating agent, wherein the breaker fluid degrades a filter-cake along the wellbore wall in the subterranean formation.

In an embodiment, the method may include an organic peroxide including hydroperoxide, peroxyacid, ketone peroxide, peroxyester, dialkylperoxide, peroxydicarbonate, peroxycarbonate, diacylperoxide, or cyclic ketone peroxide.

In an embodiment, the method may include a hydroperoxide including alkyls, alkenes, cycloalkanes, steroids, fatty acids, and/or terpenes.

In an embodiment, the method may include hydroperoxide including a tert-butyl-hydroperoxide.

In an embodiment, the method may include the organic peroxide including 0.1 to 10% by volume of the breaker fluid.

In an embodiment, the method may include an enzyme including 1 to 10% by volume of the breaker fluid.

In an embodiment, the method may include a chelating agent including 5 to 80% by volume of the breaker fluid.

In an embodiment, the method may include an enzyme including an alpha-amylase.

In an embodiment, the method may include a chelating agent including EDTA (ethylenediamine tetraacetic acid), HEDTA (hydroxyethylenediamine triacetic acid), NTA (nitriolotriacetic acid), or citric acid.

In an embodiment, the method may include an aqueous solution, wherein the aqueous solution includes water.

In an embodiment the method may include an aqueous solution, wherein the aqueous solution includes a brine.

In an embodiment, the method may include brine, wherein the brine is water including sodium bromide, potassium bromide, potassium chloride, sodium chloride, cesium bromide, or a combination thereof.

In an embodiment, the method may include an aqueous solution wherein the aqueous solution includes sodium bromide.

In an embodiment, the method may include a density breaker fluid of less than 13 lb/gal.

In an embodiment, the method may include wherein the wellbore temperature is less than 250° F.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
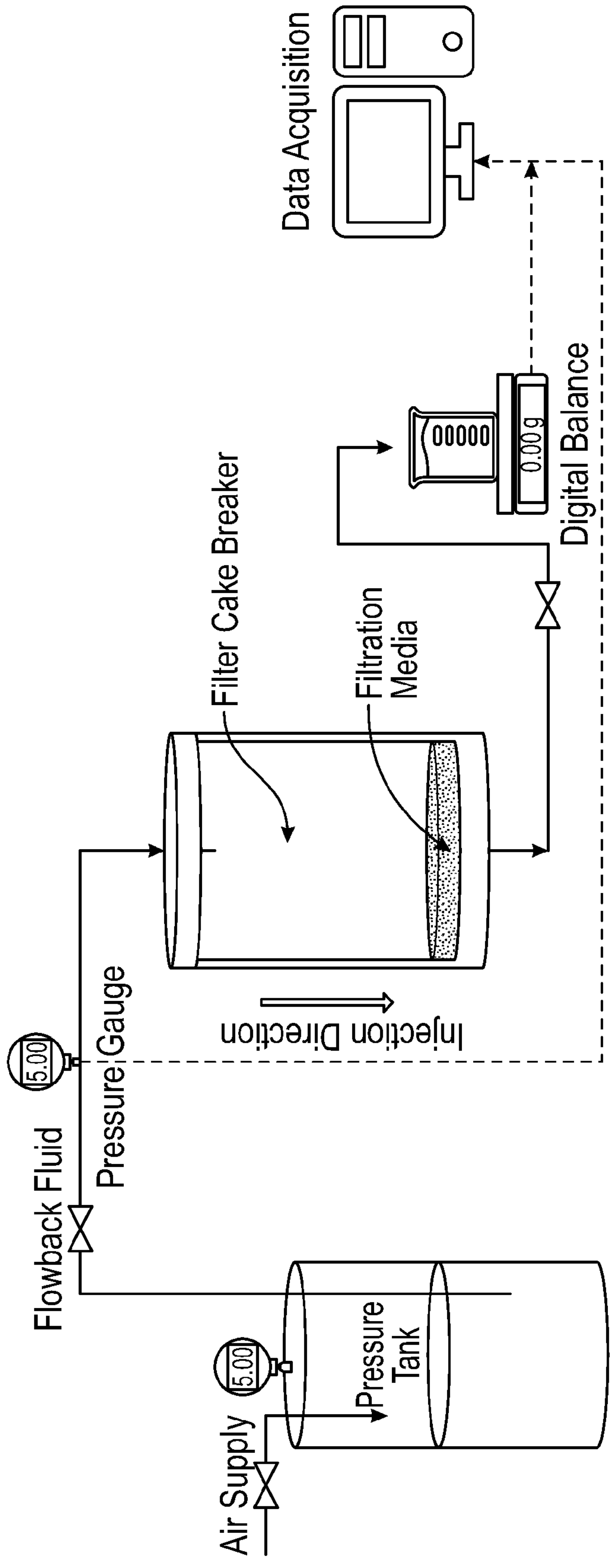
FIG. 1. Illustrates a flow diagram of the laboratory testing procedure for a filter-cake breaker fluid in an injector well.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The present disclosure is generally directed to methods and compositions for a filter-cake breaker fluid, including an organic oxidizer (referred to hereinafter as "organic peroxide"); an aqueous solution; an enzyme; and a chelating agent, used to break additives in water-based drilling fluids in direct injector wells (collectively referred to hereinafter as "the present methods and compositions"). The present methods and compositions may comprise at least one filter-cake breaker composition or fluid system (hereinafter "breaker fluid"), including at least one organic peroxide, an aqueous solution, at least one enzyme, and/or at least one chelating agent. Filter-cakes disposed upon walls of the wellbores may be degraded and/or removed from the walls by one or more interactions and/or reactions between at least one organic oxidizer, an aqueous solution, at least one enzyme, and/or at least one chelating agent.

The breaker fluid may be utilized in one or more vertical wells, deviated wells, and/or horizontal wells. Additionally, the breaker fluid may be utilized for operations in low frac gradient pressure window environments and/or narrow frac formation pressure window environments. Further, the breaker fluid may be utilized for operations in direct injector wells and production wells.

After completion of the drilling or completion process, filter-cakes deposited by drilling and treatment fluids may be broken by application of a breaker fluid that degrades the constituents of the filter-cake. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside casing or liners. The breaker fluid may contribute to the degradation and removal of the filter-cake deposited on the sidewalls of the wellbore to minimize the possibility of negatively impacting production or injection. Upon cleanup of the well, the well may then be converted to production or injection.

The breaker fluids of the present disclosure may also be formulated to contain an organic peroxide to aid in the degradation of filter-cakes within the wellbore. Organic peroxides can be classified into different groups depending on their chemical structures. In embodiments, the at least one organic peroxide may be at least one selected from hydroperoxide, peroxyacid, ketone peroxide, peroxyester, dialkylperoxide, peroxydicarbonate, peroxycarbonate, diacylperoxide, or cyclic ketone peroxide. When included, the organic peroxide may be from about 0.1-10% by volume of the breaker fluid.

Hydroperoxides are organic peroxides with the general formula of R—OOH wherein the R group includes an alkyl functional group. Additional functional groups representing the R group of the hydroperoxides include, alkenes, cycloalkanes, steroids, fatty acids, and/or terpenes. An example of a hydroperoxide that may be used as a breaker fluid additive includes a tert-butyl-hydroperoxide.

In one or more embodiments, the breaker fluid may also be formulated to contain an enzyme to aid in the degradation of filter-cakes within the wellbore. An enzyme used in the present disclosure includes an alpha-amylase. Alpha-amylases (alpha-1,4-glucan-4-glucanohydrolases) represent a group of enzymes which catalyze hydrolysis of starch and other linear and branched 1,4-glucosidic oligo- and polysaccharides. A commercially available example of an alpha-amylase that may be used in breaker fluid formulations is Wellzyme III, available from MI-LLC (Houston, TX). When included, the enzyme may be from about 1-10% by volume of the breaker fluid.

In one or more embodiments, the breaker fluids of the present disclosure may also be formulated to contain an acid to decrease the pH of the breaker fluid and aid in the degradation of filter-cakes within the wellbore. Examples of acids that may be used as breaker fluid additives include strong mineral acids, such as hydrochloric acid or sulfuric acid, and organic acids, such as citric acid, salicylic acid, lactic acid, malic acid, acetic acid, and formic acid. Suitable organic acids that may be used as the acid sources may include citric acid, salicylic acid, glycolic acid, malic acid, maleic acid, fumaric acid, and homo- or copolymers of lactic acid and glycolic acid as well as compounds containing hydroxy, phenoxy, carboxylic, hydroxycarboxylic or phenoxycarboxylic moieties. When included, the acid may be from about 5% to 20% by volume of the breaker fluid.

In one or more embodiments, the breaker fluid may contain chelants to help dissolve precipitates or other solids present in the filter-cake. Chelating agents suitable for use in the breaker fluids of the present disclosure may include polydentate chelating agents such as ethylenediaminetetraacetic acid (EDTA), diethylenetriaminepentaacetic acid (DTPA), nitrilotriacetic acid (NTA), ethylene glycol-bis(2-aminoethyl)-N, N,N',N'-tetraacetic acid (EGTA), 1,2-bis(o-aminophenoxy) ethane-N,N,N',N'-tetraacetic acid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N, N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and mixtures thereof. Such chelating agents may include potassium or sodium salts thereof in some embodiments. Particular examples of chelants that may be employed in certain embodiments include ethylenediaminetetraacetic acid (EDTA), glutamic acid diacetic acid (GLDA) (such as L-glutamic acid, N, N-diacetic acid), iminodiacetic acids and/or salts thereof. A commercially available example of chelants that may be used in breaker fluid formulations is D-SOLVER EXTRA, available from MI-LLC (Houston, TX). When included, chelating agents may be from about 5-80% by volume of the breaker fluid.

In one or more embodiments, a base fluid of a breaker fluid may include an aqueous solution selected from water or brine. In those embodiments of the disclosure where the aqueous solution is a brine, the brine is water comprising an inorganic salt or organic salt. In various embodiments of the breaker fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater, or any other organic or inorganic dissolved salts. The salt may serve to provide desired density to balance downhole formation pressures. In some embodiments, the density of the breaker fluid may be less than 13 lb/gal (pounds per gallon). When included, the aqueous solution may be from about 20-80% by volume of the breaker fluid.

In some embodiments, the aqueous solution for the breaker fluid may be a brine that includes a divalent halide that is selected from the group of alkaline earth halides or zinc halides. The brine may also include an organic salt, such as sodium, potassium, or cesium formate. Inorganic divalent salts include calcium halides, such as calcium chloride or calcium bromide. Sodium bromide, potassium bromide, potassium chloride, sodium chloride, or cesium bromide may also be used. The salt may be chosen for compatibility reasons, i.e. where the WBDF used a particular brine phase, and the breaker fluid brine phase is chosen to have the same brine phase.

It should be appreciated that the amount of delay between the time when a breaker fluid according to the present disclosure is introduced to a well and the time when the fluids have had the desired effect of breaking/degrading/dispersing the filter-cake may depend on several variables. One of skill in the art should appreciate that factors such as the downhole temperature concentration of the components in the breaker fluid, pH, amount of available water, filter-cake composition, etc. may all have an impact. For example downhole temperatures can vary considerably from 100 °F to over 400 °F depending on the formation geology and downhole environment. However, one of skill in the art via trial and error testing in the lab should easily be able to determine and thus correlate downhole temperature and the time of efficacy for a given formulation of the breaker fluids disclosed herein. With such information one can predetermined the time period necessary to shut-in a well given a specific downhole temperature and a specific formulation of the break fluid. The breaker fluid functions at wellbore temperatures of less than 250 °F.

The types of filter-cake that the present breaker fluid may break include those formed from water-based drilling fluids, but particularly water-based drilling fluids including reservoir drill-in fluids. That is, the filter-cake may be a water-based filter-cake (such as an aqueous filter-cake in which water or another aqueous fluid is the continuous phase). Additionally, the present breaker fluids may be particularly useful for breaking filter-cakes that contain synthetic polymers, including crosslinked and branched synthetic polymers that are often not able to be broken by conventional breaker fluid formulations. However, the breakers may also be effective in breaking fluids/filter-cakes formed with conventional polymers used in water-based fluids, such as xanthan and starches.

As described above, the breaker fluid may be circulated in the wellbore during or after the performance of at least one completion operation. In other embodiments, the breaker fluid may be circulated either after a completion operation or after production of formation fluids has commenced to destroy the integrity of and clean up residual drilling fluids remaining inside casing or liners.

Generally, a well is often "completed" to allow for the flow of hydrocarbons out of the formation and up to the surface. As used herein, completion processes may include one or more of the strengthening the well hole with casing, evaluating the pressure and temperature of the formation, and installing the proper completion equipment to ensure an efficient flow of hydrocarbons out of the well or in the case of an injector well, to allow for the injection of gas or water. Completion operations, as used herein, may specifically include open hole completions, conventional perforated completions, sand exclusion completions, permanent completions, multiple zone completions, and drainhole completions, as known in the art. A completed wellbore may contain at least one of a slotted liner, a predrilled liner, a wire wrapped screen, an expandable screen, a sand screen filter, an open hole gravel pack, or casing, for example.

In some embodiments, breaker fluids can be used for cleaning up the filter-cake in perforation channels. Additionally, during completion operations, when fluid loss is suspected, a fluid loss pill of polymers and/or bridging agents may be spotted into the wellbore to reduce or prevent such fluid loss by injection of other completion fluids behind the fluid loss pill to a position within the wellbore which is immediately above a portion of the formation where fluid loss is suspected. Injection of fluids into the wellbore is then stopped, and fluid loss will then move the pill toward the fluid loss location. For example, a cross-linked hydroxyethyl cellulose (HEC) with sized calcium carbonate, rock salt or oil soluble resins can be used as a fluid loss control pill. After any completion operations have been accomplished, removal of filter-cake (formed during drilling and/or completion) remaining on the sidewalls of the wellbore may be necessary.

Although filter-cake formation and use of fluid loss pills are often used in drilling and completion operations, these barriers can present an impediment to the production of hydrocarbon or other fluids from the well, or to the injection of water and/or gas, if, for example, the rock formation is still plugged by the barrier. Because the filter-cake is compact, it often adheres strongly to the formation and may not be readily or completely flushed out of the formation by fluid action alone.

Yet another embodiment of the present invention involves a method of cleaning up a wellbore drilled with a water-based drilling fluid, described above. In one such illustrative embodiment, the method involves circulating a breaker fluid disclosed herein in a wellbore and then shutting in the well for a predetermined amount of time to allow penetration and fragmentation of the filter-cake to take place. Upon fragmentation of the filter-cake, the fluid (and residual filter-cake dispersed therein) can be easily produced from the wellbore upon initiation of production and thus the residual drilling fluid is easily washed out of the wellbore. Alternatively, a wash fluid (different from the breaker fluid) may be circulated through the wellbore prior to commencing production.

The fluids disclosed herein may also be used in a wellbore where a screen is to be put in place downhole. After a hole is under-reamed to widen the diameter of the hole, the drilling string may be removed and replaced with production tubing having a desired sand screen. In one or more embodiments, an expandable tubular sand screen may be expanded in place or a gravel pack may be placed in the well. Breaker fluids may then be placed in the well, and the well is then shut in to allow penetration and fragmentation of the filter-cake to take place. Upon fragmentation of the filter-cake, the fluids can be easily produced from the wellbore upon initiation of production and thus the residual drilling fluid is easily washed out of the wellbore. In one or more embodiments, a wash fluid (different from the breaker fluid) may be circulated through the wellbore prior to commencing production.

However, the breaker fluids disclosed herein may also be used in various embodiments as a displacement fluid and/or a wash fluid. As used herein, a displacement fluid is typically used to physically push another fluid out of the wellbore, and a wash fluid typically contains a surfactant and may be used to physically and chemically remove drilling fluid residue from downhole tubulars. When also used as a displacement fluid, the breaker fluids of the present disclosure may act to effectively push or displace the drilling fluid. When also used as a wash fluid, the breaker fluids may assist in physically and/or chemically removing the filter-cake once the filter-cake has been disaggregated by the breaker system.

Further, in some embodiments, the breaker fluids of the present disclosure may be used in wells that have been gravel packed. For example, as known to those skilled in the art, gravel packing involves pumping into the well (and placing in a production interval) a carrier fluid (conventionally a viscoelastic fluid) that contains the necessary amount of gravel to prevent sand from flowing into the wellbore during production. However, filter-cake remaining on the walls and the viscoelastic carrier fluid should be removed prior to production. In a particular embodiment, after placement of a gravel pack, a breaker fluid of the present disclosure may be emplaced in the production interval and allowed sufficient time to decrease the viscosity of the viscoelastic carrier fluid and then penetrate and fragment filter-cake in the interval, as described above. Alternatively, a wash fluid may be used following the placement of the gravel pack, but prior to the emplacement of the breaker fluid.

Testing Protocol

Laboratory testing begins by conducting the initial injection direction flow on a filter disk (API 40 micron or similar simulated formation disk) using the filtered seawater at 5 psi (FIG. 1). Next, the time required for 200 mL of filtered seawater to pass through the disk is recorded. The process is repeated for a total of 600 mL. The average flow rate is taken as the average initial injection flow rate. Four 4-hour filter-cakes at 80° C. and 500 psi are then built. The then cooled down and the WBDF is decanted carefully.

The cell is then filled with 70 ml of 1.15 SG breaker system with caution so that the filter-cake is not disturbed. The timer to count the delay is started once the cell is filled with a breaker. The cell is placed inside the heating jacket and 300 psi is applied. The bottom valve stem is then opened to monitor the breakthrough. The heating jacket is then set to 80° C. The bottom valve stem remains opened until a breakthrough occurs. Ten mL of breaker leak-off is collected, leaving 60 mL of the breaker in the cell. The cell is opened and topped up with a fresh breaker if the leak-off volume is more than 10 mL. The cell is shut in and the pressure is reduced to 100 psi after the breakthrough. Next, the bottom valve stem is shut and the filter-cake is soaked with the breaker for 5 days. The time that breakthrough occurs is recorded. The bottom valve stem is not opened again for the remaining period of the test.

The cell is cooled down at the end of the soaking period. The spent breaker is then injected through the disk with the filtered seawater until clear effluent is observed. A minimum of two times the breaker volume is recommended to be injected before measuring the final injection flow rate. The final injection direction flow is conducted using the filtered seawater at 5 psi. The time required for 200 ml of filtered seawater to pass through the disk is then recorded. The process is then repeated two more times for a total of 600 mL of filtered seawater. The final injection flow rates are reported for every 200 mL. The return to flow percentage for each flow step is then calculated, using the following equation:

$$\text{Return To Flow \%} = 100 \times \frac{\text{Final Injection Flow Rate (mL/sec)}}{\text{Average Initial Injection Flow Rate (mL/sec)}}.$$

This ensures that the injection is not impacted by the residual solids plugging and compaction with the flow. Residual filter-cake/disk is removed from the cell and a picture is taken. An iodine test is performed to identify the unbroken starch (black color indicates the presence of starch) and an HCl test is performed to determine the residual calcium carbonate. A picture is then taken of the results.

Examples of Filter-Cake Breaker Fluids Tested

Conventional filter-cake breaker fluid as an additive.

Figures 2A, 2B:
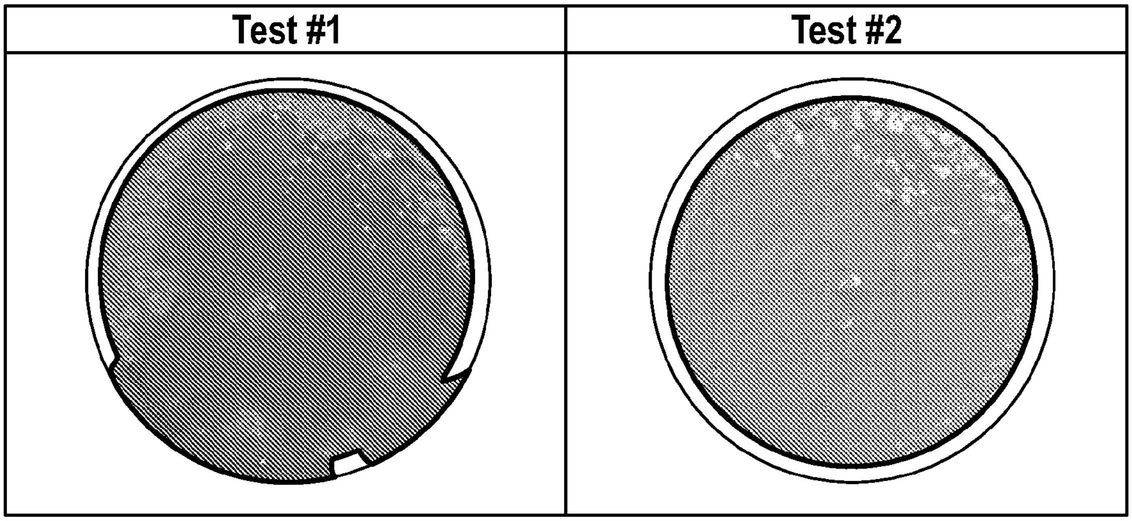
FIG. 2A illustrates results of a conventional FCBF used to clean a WBDF filter-cake in direct injector wells.
FIG. 2B illustrates an iodine test of starch content remaining in the filter-cake after the use of the conventional FCBF.

An example is given in FIG. 2A for an injector well. No direct injection was achieved when a conventional FCBF was used to clean the WBDF filter-cake. The pictures in FIG. 2B indicate that all the starches in the filter-cake were removed by enzymes (Wellzyme III) and calcium carbonate in the filter-cake by a chelating agent (D-Solver Extra). The iodine test confirmed the absence of starch, where a few droplets were dropped onto the cake residues. If the iodine droplets stay light orange-brown (Test 2), there is no starch left. If the iodine solution turns black (Test 1), starch is still present. Therefore, the zero injection was caused by the combined effect of biopolymer, lubricant, and drilled solid residues.

Filter-cake breaker fluid using an internal oxidizer as an additive.

Figures 3A, 3B:
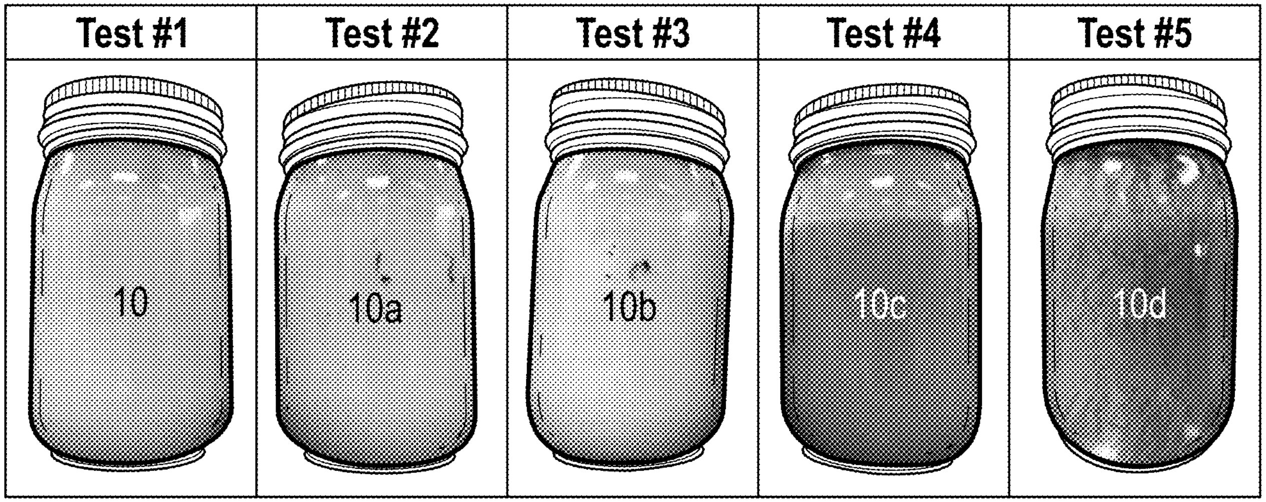
FIG. 3A illustrates internal oxidizers used in a WBDF system with a shale inhibitor and lubricant.
FIG. 3B illustrates results of the internal oxidizer used in combination with a shale inhibitor and lubricants on the filter-cake.

For those reasons, internal oxidizers, which can be added to WBDF while drilling, have been developed. Internal oxidizers are relatively inert to the other additives in WBDF. They will form as part of the filter-cake on the wellbore until they are activated by the acidic FCBF, which is spotted in the well at the end of the drilling phase to facilitate production or injection. However, the internal oxidizer approach has some limitations, such as premature temperature-induced activation and compatibility with other additives in the WBDF. In FIG. 3A, an internal oxidizer (M-I Commercial Names=D-STROYER/SAFE-BREAK MP) was used in combination with a shale inhibitor and lubricant in WBDF. An incompatibility issue was evidenced (FIG. 3B), which led to the removal of the internal oxidizer from the WBDF. Tests 1-5 (10-10*d*) illustrate the effects of various concentrations of internal oxidizers, shale inhibitor, and lubricants on the filter-cake.

Filter-cake breaker fluid using an external oxidizer as an additive.

Figures 4A, 4B:
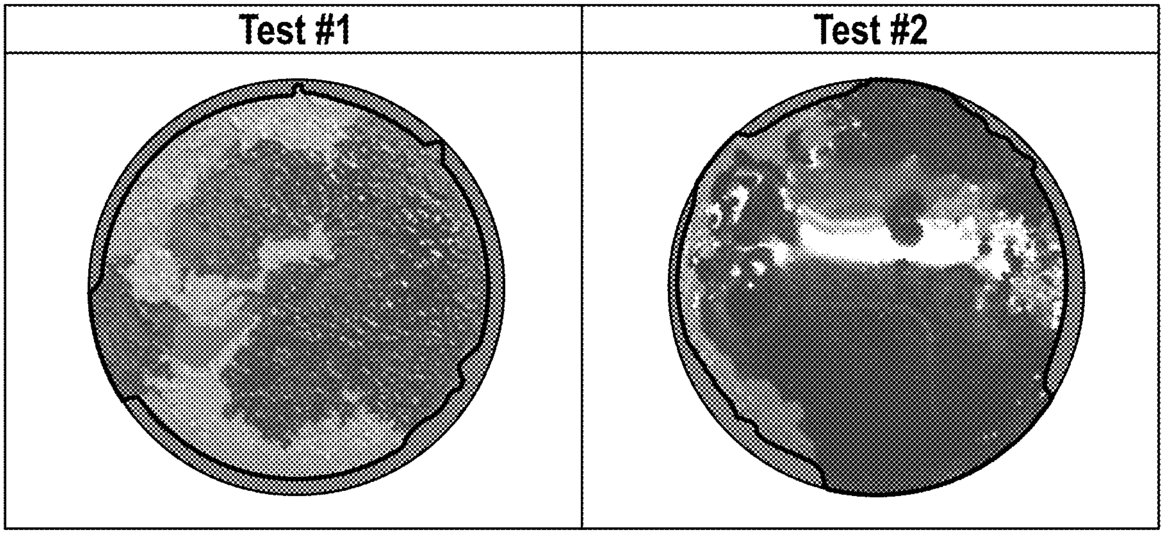
FIG. 4A illustrates external oxidizers used in a WBDF filter-cake system with sodium bromide, a chelating agent, and water.
FIG. 4B illustrates an iodine test of the starch content remaining in the filter-cake after the use of the external oxidizer.

With the internal oxidizer being ruled out from the testing, the external oxidizer was the alternative option. Unlike the internal oxidizer, external oxidizers are directly added into the FCBF and pumped downhole. On the downside, external oxidizers tend to be aggressive and have the potential to attack other additives in the FCBF. An enzyme is therefore left out from the FCBF because the oxidizer is supposed to remove biopolymer, lubricant, and also starch from the filter-cake. Having enzymes in FCBF would be redundant. However, that was proven otherwise in the following testing shown in FIG. 4A. External organic oxidizer was ineffective in removing the starches in the filter-cake indicated by post-test analysis (FIG. 4B, Test 1 and 2: iodine test on starch residues→black color), resulting in no injection.

Filter-cake breaker fluid using a tert-butyl-hydroperoxide and an enzyme combination as an additive.

Figures 5A, 5B:
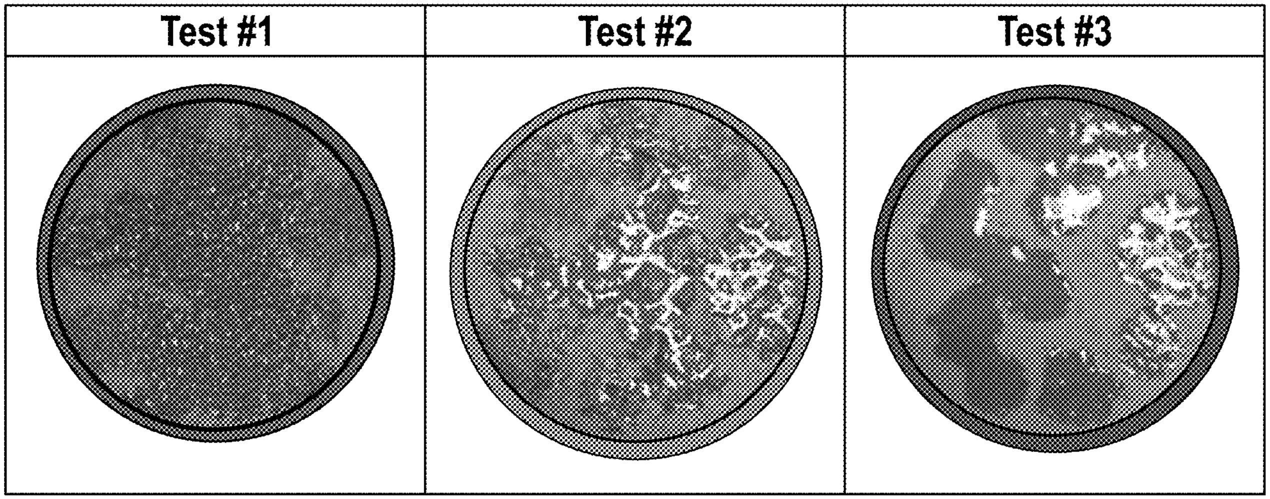
FIG. 5A illustrates an enzyme and organic oxidizers used in a WBDF filter-cake system with sodium bromide, a chelating agent, and water.
FIG. 5B illustrates the iodine test of the starch content remaining in the filter-cake after the use of the enzyme and organic oxidizer.

Unsuccessful attempts to improve the direction of injection led to the combination of enzyme and organic oxidizer, which is novel. Contrary to the previous assumption that the enzyme would be denatured by the oxidizer, both enzyme and organic oxidizer work in tandem to achieve decent injection in the filter-cake breaker testing even with drilled solids contamination, as documented in FIG. 5A. The iodine test confirmed no indication of starch residues in FIG. 5B (light orange-brown color).

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A breaker fluid comprising:

an organic peroxide comprising tert-butyl-hydroperoxide, wherein the organic peroxide is present in an amount between 0.1% by volume and 10% by volume of the breaker fluid;

an aqueous solution;

an enzyme, wherein the enzyme is present in an amount between 1% by volume and 10% by volume of the breaker fluid; and a chelating agent, wherein the breaker fluid is dispersed in a subterranean formation, wherein the organic peroxide and the enzyme of the breaker fluid are configured to work in tandem to degrade a filter-cake along a wellbore wall in the subterranean formation, wherein the filter-cake is formed from a water-based drilling fluid and comprises starch, and wherein the organic peroxide alone is ineffective to remove the starch and the enzyme is configured to catalyze hydrolysis of the starch in the presence of the organic peroxide.

2. The breaker fluid of claim 1, wherein the chelating agent is present in an amount between 5% by volume and 80% by volume of the breaker fluid.

3. The breaker fluid of claim 1, wherein the enzyme comprises an alpha-amylase, wherein the chelating agent comprises EDTA (ethylenediamine tetraacetic acid), HEDTA (hydroxyethylenediamine triacetic acid), NTA (nitrilotriacetic acid), or citric acid.

4. The breaker fluid of claim 1, wherein the aqueous solution comprises water.

5. The breaker fluid of claim 1, wherein the aqueous solution comprises a brine.

6. The breaker fluid of claim 5, wherein the brine is water comprising sodium bromide, potassium bromide, potassium chloride, sodium chloride, cesium bromide, or a combination thereof.

7. The breaker fluid of claim 1, wherein the aqueous solution comprises sodium bromide.

8. A method comprising:

dispersing a breaker fluid into a wellbore of a subterranean formation, wherein the breaker fluid comprises:

an organic peroxide comprising tert-butyl-hydroperoxide, wherein the organic peroxide is present in an amount between 0.1% by volume and 10% by volume of the breaker fluid;

an aqueous solution;

an enzyme, wherein the enzyme is present in an amount between 1% by volume and 10% by volume of the breaker fluid; and a chelating agent, wherein the organic peroxide and the enzyme of the breaker fluid work in tandem to degrade a filter-cake along a wellbore wall in the subterranean formation, wherein the filter-cake is formed from a water-based drilling fluid and comprises starch, and wherein the organic peroxide alone is ineffective to remove the starch and the enzyme catalyzes hydrolysis of the starch in the presence of the organic peroxide.

9. The method of claim 8, wherein the chelating agent is present in an amount between 5% by volume and 80% by volume of the breaker fluid.

10. The method of claim 8, wherein the enzyme comprises an alpha-amylase, wherein the chelating agent comprises EDTA (ethylenediamine tetraacetic acid), HEDTA (hydroxyethylenediamine triacetic acid), NTA (nitrilotriacetic acid), or citric acid.

11. The method of claim 8, wherein the aqueous solution comprises water.

12. The method of claim 8, wherein the aqueous solution comprises a brine.

13. The method of claim 12, wherein the brine is water comprising sodium bromide, potassium bromide, potassium chloride, sodium chloride, cesium bromide, or a combination thereof.

14. The method of claim 8, wherein the aqueous solution comprises sodium bromide.

15. The breaker fluid of claim 1, wherein:

the enzyme comprises an alpha-amylase;

the chelating agent comprises EDTA (ethylenediamine tetraacetic acid), HEDTA (hydroxyethylenediamine triacetic acid), NTA (nitrilotriacetic acid), or citric acid;

the chelating agent is present in an amount between 5% by volume and 80% by volume of the breaker fluid;

the aqueous solution comprises a brine comprising sodium bromide;

the aqueous solution is present in an amount between 20% by volume and 80% by volume of the breaker fluid;

the breaker fluid is configured for use in a direct injector well; and the breaker fluid is configured to improve injection of the direct injector well following degradation of the filter-cake via the enzyme and the organic peroxide relative to a breaker fluid that does not include the organic peroxide or the enzyme.

16. The method of claim 8, wherein:

the enzyme comprises an alpha-amylase;

the chelating agent comprises EDTA (ethylenediamine tetraacetic acid), HEDTA (hydroxyethylenediamine triacetic acid), NTA (nitrilotriacetic acid), or citric acid;

the chelating agent is present in an amount between 5% by volume and 80% by volume of the breaker fluid;

the aqueous solution comprises a brine comprising sodium bromide;

the aqueous solution is present in an amount between 20% by volume and 80% by volume of the breaker fluid;

the breaker fluid is dispersed in a direct injector well of the subterranean formation; and the breaker fluid improves injection of the direct injector well following degradation of the filter-cake via the enzyme and the organic peroxide relative to a breaker fluid that does not include the organic peroxide or the enzyme.

* * * * *